(12) United States Patent
Ding

(10) Patent No.: US 7,721,395 B2
(45) Date of Patent: May 25, 2010

(54) AUTOMATIC CONTAINER COUPLING TOOL

(75) Inventor: Yinqing Ding, Kunshan (CN)

(73) Assignee: Kunshan Lucky Sea Industry Co., Ltd., Lujia Town, Kunshan, Jiangsu Province (CN)

( * ) Notice: Subject to any disclaimer, the term of this patent is extended or adjusted under 35 U.S.C. 154(b) by 497 days.

(21) Appl. No.: 11/824,712

(22) Filed: Jul. 2, 2007

(65) Prior Publication Data
US 2008/0014040 A1    Jan. 17, 2008

(30) Foreign Application Priority Data
Jul. 3, 2006    (CN) .................... 2006 2 0074657 U

(51) Int. Cl.
*B60P 7/80*    (2006.01)

(52) U.S. Cl. .............................. 24/287; 410/82; 410/68; 410/69

(58) Field of Classification Search .................. 410/82, 410/83, 84, 68, 69, 73, 76, 79; 280/406.1; 24/287; 248/500, 503
See application file for complete search history.

(56) References Cited

U.S. PATENT DOCUMENTS 5,931,617 A * 8/1999 Kroll et al. ..................... 410/91

* cited by examiner

*Primary Examiner*—Stephen Gordon

(57) ABSTRACT

An automatic container coupling tool is disclosed, such coupling tool includes a coupling platform, a bottom engager and a top guiding protrusion oppositely extended from the coupling platform, the bottom engager has an engager neck, a pair of projecting lug extended from the engager neck to form a pair of holding cavity between the coupling platform and the projecting lugs, once the bottom engager is inserted into a corner fitting housing of a lower container, the bottom engager is rotated allowing the ceiling wall inserted into the holding cavity. The top guiding protrusion has a front guiding slope and a rear retaining shoulder, such that after the bottom engager is interlocked with the lower container, an upper container is perched onto the coupling tool, the opening edge of the bottom corner housing of the upper container will bias against the front guiding slop thus rearwardly shift the top guiding protrusion to snap onto the corner housing so as to couple the upper container onto the coupling tool as well.

20 Claims, 7 Drawing Sheets

AUTOMATIC CONTAINER COUPLING TOOL

BACKGROUND OF THE PRESENT INVENTION

1. Field of Invention

The present invention relates to a kind of coupling tool, and more particularly, relates to a kind of automatic shipping container coupling tool which is simple in structure, convenient and reliable in practices for detachably stacking shipping containers.

2. Description of Related Arts

Commonly, the shipping containers are stacked one another for achieving an optimized efficiency in transportation. To ensure the security, one or more couplers would be applied between any pair of overlaid containers. On the other hand, shipping containers are designed to fit standard size, and are prepared with corner fittings with international standard size. Each of such corner fittings has an exposed opening defined thereon for insertion of the couplings.

A coupling, or a coupler, is a mechanism for vertically connecting shipping containers during transportation. The design of such couplers is very important, since flexibility and convenience are maximized if the couplers could work together no matter what order they come in.

However, the conventional container couplers are inefficient and slow in practices for stacking an upper shipping container onto a lower shipping container. Commonly, a coupler comprises an upper portion and a lower portion respectively adapted for inserting into respective corners fittings of two containers. Generally, two containers are coupled in such a manner. In loading processes, the upper container is hung in the air by a crane, a coupler should be manually rotated to be inserted into the corner fitting holes for enabling the upper portion of the coupler well and securely received within a bottom corner fittings of the upper container. Afterwards, the upper container would be lowered by the crane enabling the lower portion of the coupler accommodated within a top corner fitting hole of a lower container. In such process, the lower portion of the coupler had to be manually rotated between a disengaged position and an engaging position for inserting through the corner-fitting opening. Vice versa, such couplers had to be manually rotated another time to be extracted from the corner fitting holes for releasing the upper container from the lower container.

Needless to say, considerable labor maneuverability might be required for handling the couplers in shipping process, and the safety issue would be one of the main arguments for how to couple and stack shipping containers. Besides inefficient and slow in practice, a prominent drawback of the conventional hand-coupled system is relatively unsafe to workers. Most of the cases, personnel would have to get in between containers, for either coupling or uncoupling procedures.

On the other hand, a conventional coupler is made up of many parts, which leads to a complicated structure of such kind of coupler. As a result, the maintenance and reparation of such kind of couplings would be difficult and expectably expensive. Therefore, a kind of innovative container coupling tool, which is simple in structure, and efficient reliable in operation would be definitely welcomed within the art.

SUMMARY OF THE PRESENT INVENTION

A main object of the invention is to provide an automatic container coupler disposed between stacked containers for preventing displacements without excessive manual maneuverability, and to ensure two shipping containers be coupled with an efficient and reliable manner.

Another object of the present invention is to provide an automatic container coupler for over stacking shipping containers, wherein such coupler comprises a top guiding protrusion and a bottom engager, which is managed to be inserted into a top corner fitting hole of a lower container and perched thereon. And more importantly, the design of the top guiding protrusion is capable of allowing a second top container securely and slidably snapped on such coupler with a high efficiency manner. I.e., after the coupler is simply mounted onto the first (lower) shipping container, a second container, hoisted by a crane or shipping container lifting means, could be vertically aligned with the bottom container and slidably and automatically interlock the container body onto the coupler, thus enabling two shipping container stacked together.

Another object of the invention is to provide an automatic container coupler adapted for disposing between two containers stacked one another, wherein the coupler is designed with a simple structure thus permitting two stacked shipping containers detached one another easily and no complicated or redundant manual procedures would be necessary.

Another object of the present invention is to provide an automatic container coupler for over stacking containers, wherein no complicated parts and equipments would be required to achieve above-mentioned objects. As a result, the manufacturing time and cost would significantly reduced.

Another object of the present invention is to provide an automatic container coupling tool for over stacking containers, wherein the coupling tool further comprises an engaging locking arrangement such that after the bottom engager is inserted and received within the corner fitting holes of the lower container, a user is able to manage such engaging locking arrangement for strengthening the locking position.

Accordingly, in order to accomplish the above objects, the present invention provides an automatic container coupling tool adapted for disposing between a pair of containers, a lower container and an upper container, stacked one another for prevent a displacement thereof, comprising:

a coupling tool body having a coupling platform;

a bottom engager downwardly extended from the platform and adapted to be inserted into a top corner fitting housing of the lower container, wherein the bottom engager comprises an engager neck and an pair of opposed projecting lugs sidewardly provided a lower edge of the engager neck to generate an elongated engager plate and define a pair of holding cavities between the projecting lug and the coupling platform, wherein the elongated plate is correspondingly shaped to match an opening of the corner fitting housing so as to enable the bottom engager inserted into the top corner fitting housing and shifted between an engaging position and a disengaging position;

wherein at the disengaging position, the elongated plate is capable of being freely extracted from the corner fitting housing, at the engaging position, the bottom engager is rotated forcing a ceiling wall of the top corner fitting housing received within the holding cavities to interlock the bottom engager with the lower container; and a top guiding protrusion upwardly extended from the platform and adapted to be inserted into a bottom corner fitting housing of the upper container, wherein the top guiding protrusion comprises a lower guiding slope defined at a front side of the top guiding protrusion and an upper retaining shoulder provided at a rear side of the top guiding protrusion, such that after the bottom engager is interlocked within the lower container in the engaging position, the upper container is capable of being lowered aligning the bottom corner fitting housing with the coupler tool body, an opening edge of the bottom corner fitting housing is sliding against the guiding slope so as to rearwardly shift the top guiding protrusion with respect to the bottom corner fitting housing thus pushing the upper retaining shoulder shoved into the bottom corner fitting housing to retain the upper container in position above the coupling tool.

These and other objectives, features, and advantages of the present invention will become apparent from the following detailed description, the accompanying drawings, and the appended claims.

DETAILED DESCRIPTION OF THE PREFERRED EMBODIMENT

Figure 1:
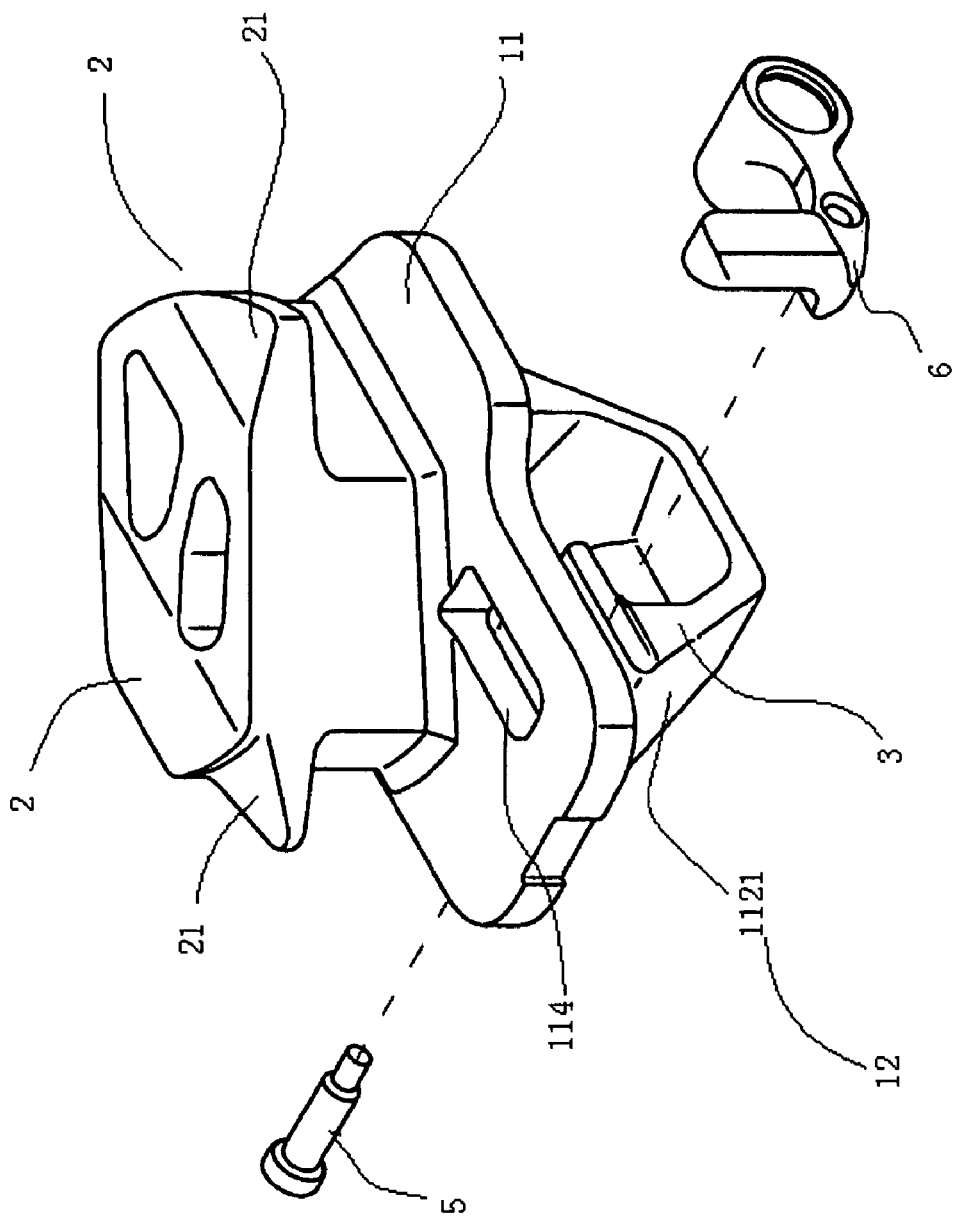
FIG. 1 is a perspective view of an automatic container coupling tool according to a preferred embodiment of the present invention.

Referring to FIG. 1 of the drawings, an automatic container coupling tool 1 according to a preferred embodiment of the present invention is illustrated. The automatic container coupling tool is adapted for disposing between a pair of shipping containers, namely a lower container and an upper container, stacked one another for prevent a displacement between such two containers. Notably, the containers are prepared with bottom and top corner fitting housings with international standard, and each of the corner fitting housings is defined to leaver an exposing rectangular opening.

According to the present invention, the coupling tool 1 comprises a coupling tool body having a coupling platform 11, a bottom engager 2 downwardly extended from the platform 11 and adapted to be inserted into a top corner fitting housing of the lower container, wherein the bottom engager 2 comprises an engager neck 22 and an pair of opposed projecting lugs 21 sidewardly provided a lower edge of the engager neck 22 to generate an elongated engager plate 23 and define a pair of holding cavities 113 between the projecting lug 21 and the coupling platform 11, wherein the elongated plate 23 is correspondingly shaped to match the rectangular opening of the corner fitting hosing so as to enable the bottom engager 2 received within the top corner fitting housing between an engaging position and a disengaging position, in the disengaging position, the elongated plate 23 is capable of being freely extracted from the corner fitting housing, whereas in the engaging position, the bottom engager is rotated forcing the ceiling wall of the corner fitting housing received within the holding cavities 113.

Figure 3:
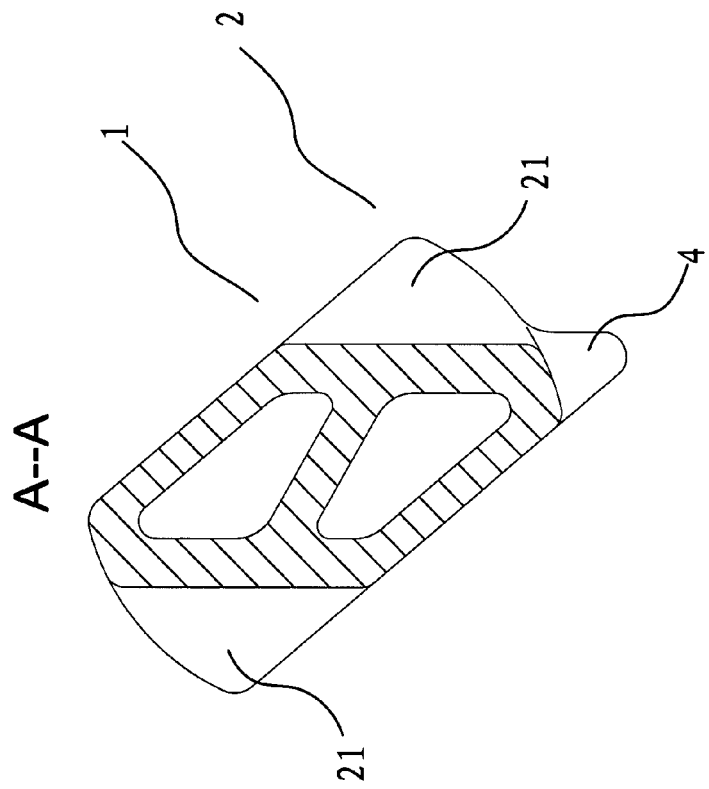
FIG. 3 is an A-A sectional view of the FIG. 2 according to the above preferred embodiment of the present invention.
Figure 2:
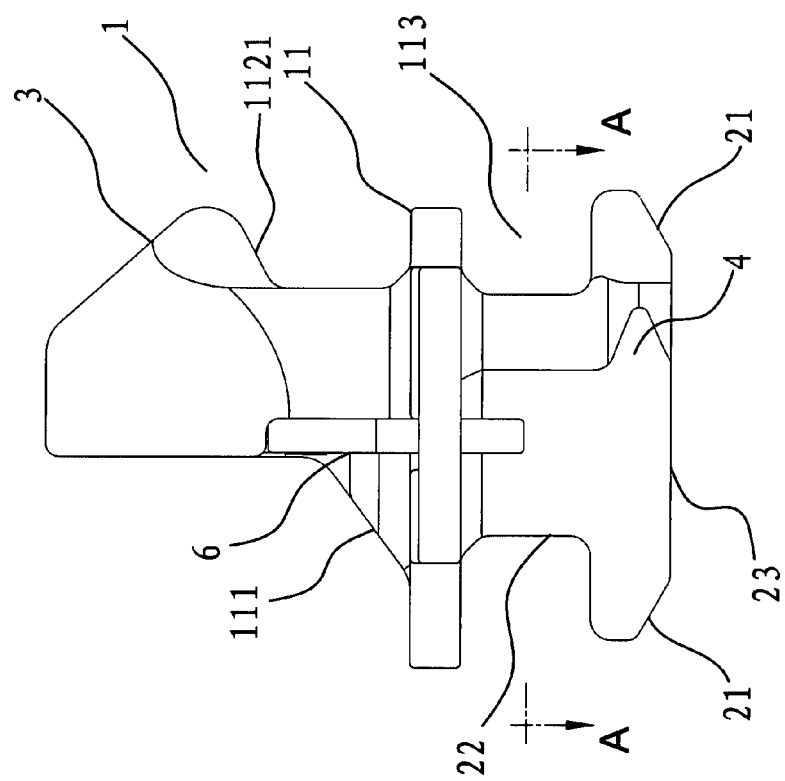
FIG. 2 is a right view of an automatic container coupling tool to the above preferred embodiment of the present invention.

As shown in FIG. 2 and FIG. 3, the bottom engager 2 is downwardly extended from the coupling platform 11 to define two U-shaped cavities between the coupling platform 11 and the bottom engager 2. Preferably, the engager neck 22 is parallelogram shaped barrel downwardly extended from the bottom of the coupling platform 11, wherein two projecting lug 21 are oppositely projected from a pair of parallel sides of the engager neck 22 at a lower position so as to generate a pair of diagonal strut at the bottom end of the engager neck 22. Such design is to ensure the parallelogram shaped engager neck 22 extended into an elongated shaped body correspondingly mated with the elongated shaped corner fitting housing opening.

In other words, the projecting lugs 21 are pair of strut prepared at the end of the engager neck 22 for holding the coupling tool within the top corner fitting housing of the lower container in practice. Whenever the coupling tool body is rotated within the top corner fitting housing, the pair of parallel side wall of the engager neck 22 will rotated to certain position aligning with the opening edge of the corner fitting housing, a portion of the ceiling wall of the corner fitting housing will be angularly inserted into the holding cavity 113 and the projecting lug 21 will be applied as holding strut biasing against the opening edge of the corner fitting housing for preventing the bottom engager being pull out of the top corner fitting housing.

As shown in FIGS. 1, 2, 3 and 7, the bottom engager further comprises a rotating blocker 4 laterally protruded from a corner of the elongated plate 23 for facilitating the user to shift the bottom engager 2 between the disengaging position and the engaging position.

Figure 4:
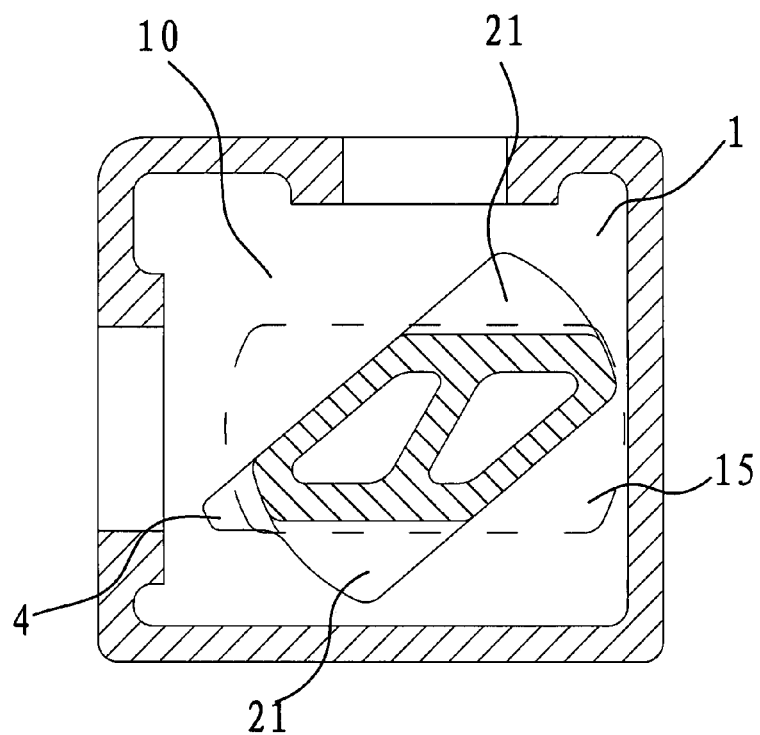
FIG. 4 is a sectional view illustrating the automatic container coupling tool is mounted in the right way according to the above preferred embodiment of the present invention.
Figure 5:
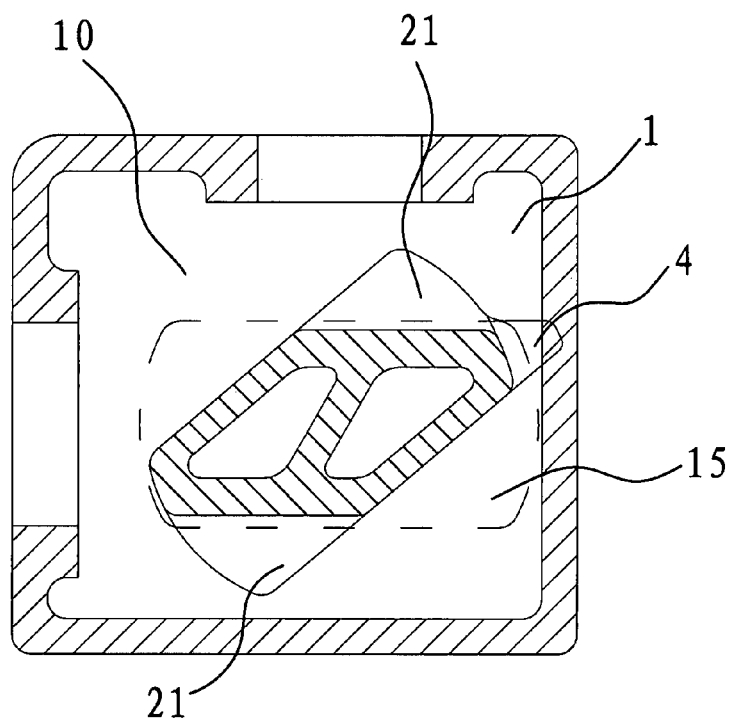
FIG. 5 is a sectional view illustrating the automatic container coupling tool is mounted in the wrong way according to the above preferred embodiment of the present invention.

Referring to FIGS. 3, 4, and 5, the relationship between the bottom engager and the corner fitting housing is illustrated. The elongated plate 23 of the bottom engager 2 is generally constructed to have a rectangular cross section. Accordingly, the corner fitting housing has a chamber 10 and a corner fitting housing opening 15 shaped in rectangle as well. When two containers stacked one on the other, the bottom engager 2 is inserted into the inner chamber 10 through the openings 15. Firstly, a user should hold the coupling tool in an inclined manner so as to lead the two projecting lugs 21 smoothly pass into the openings 15 to finally enter into the inner chamber 10 of the corner fitting housing. Secondly, the user would keep rotating the coupling tool until the two sidewalls of the engage neck 22 fully biased against the housing opening 15. If the user rotated the bottom engager 2 with a wrong direction, the rotating blocker 4 will encounter the side wall of the chamber 10 giving the user a feedback that he or she hit a wrong direction.

In other words, two projecting lugs are formed as two opposite corners of the elongated plate 23, whereas the rotating blocker 4 is provide at another corner between two projecting lugs 21. Such design is to ensure the bottom engager 2 will be always rotated to a corrected position within the top corner fitting housing. According to the preferred embodiment of the present invention, the elongated plate 23 is correspondingly shaped to match the elongated shaped opening of the corner fitting housing as shown in FIG. 4 and FIG. 5. Presumably, the rotating blocker 4 will freely expanded into the housing cavity in the engaging position. However, if the user rotated the bottom engager into a wrong orientation, as shown in FIG. 5, the rotating block 4 will be blocked by the inner wall of the corner fitting housing thus preventing the bottom engager from further motion. It is worth to mention the rotating blocker 4 would provide the user a huge advantage in practice. The user would no longer base on personal experience to align the bottom engager 2 with the corner fitting housing edge. Instead, the user merely rotate the coupling tool until the side wall of the engager neck 22 fully overlapped with the opening edge.

Furthermore, the coupling tool of the present invention further comprises a top guiding protrusion 3 upwardly extended from the coupling platform 11 and adapted to be inserted into a bottom corner fitting housing of the upper container, wherein the top guiding protrusion 3 comprises a lower guiding slope 111 defined at a front side and an upper retaining shoulder 112 provided at a rear side, such that after the bottom engager 2 is interlocked within the lower container in the engaging position, the upper container is lowered to allow a bottom corner fitting housing of the upper container align with the coupler body 1, the opening edge of the bottom corner fitting housing is siding against the guiding slope 111 so as to transversely shift the top guiding protrusion 3 with respect to the bottom corner fitting housing thus pushing the upper retaining shoulder 112 shoved into the bottom corner fitting housing to retain the upper container in position.

Preferably, the top guiding protrusion 3, the bottom engager 2 and the coupling platform are integrally formed for enhancing the overall structure and for simplifying the manufacturing procedure.

Figures 7, 8:
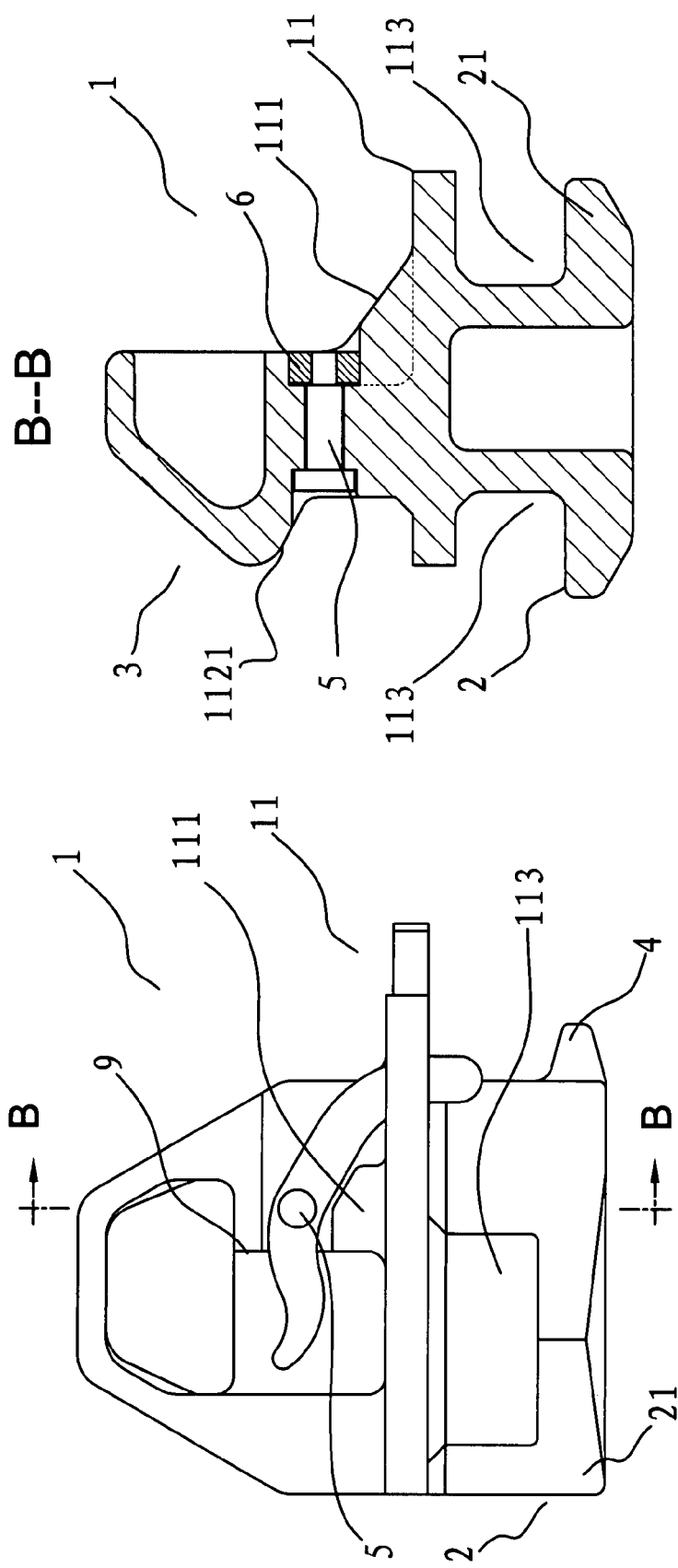
FIG. 7 is a front view of the automatic container coupling tool according to the above preferred embodiment of the present invention.
FIG. 8 is a B-B sectional view of the FIG. 6 according to the above preferred embodiment of the present invention.
Figure 10:
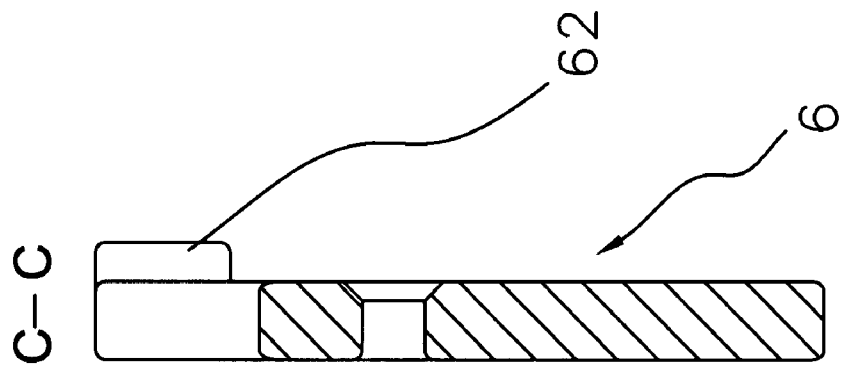
FIG. 10 is a C-C sectional view of the FIG. 8 according to the above preferred embodiment of the present invention.

Referring to FIGS. 2, 7 and 8, the guiding slope 112 is gradually and upwardly inclined from the coupling platform 11. Such design is to guide the upper container automatically coupled onto the coupling tool of the present invention. On the other hand, the bottom side of the retaining shoulder 112 is defined as an inclined slope 1121 as well. In the disengaging position, the upper container will be lifted by a foreign force, such as a harbor crane. Subsequently, the upwardly moved bottom corner fitting housing will immediately press the retaining shoulder 112. The opening edge of the bottom corner fitting housing will slidably biasing against the inclined slope 1121 as well thus shoving the top guiding protrusion 3 shift frontward so as to release the bottom corner fitting housing of the upper container.

Figure 9:
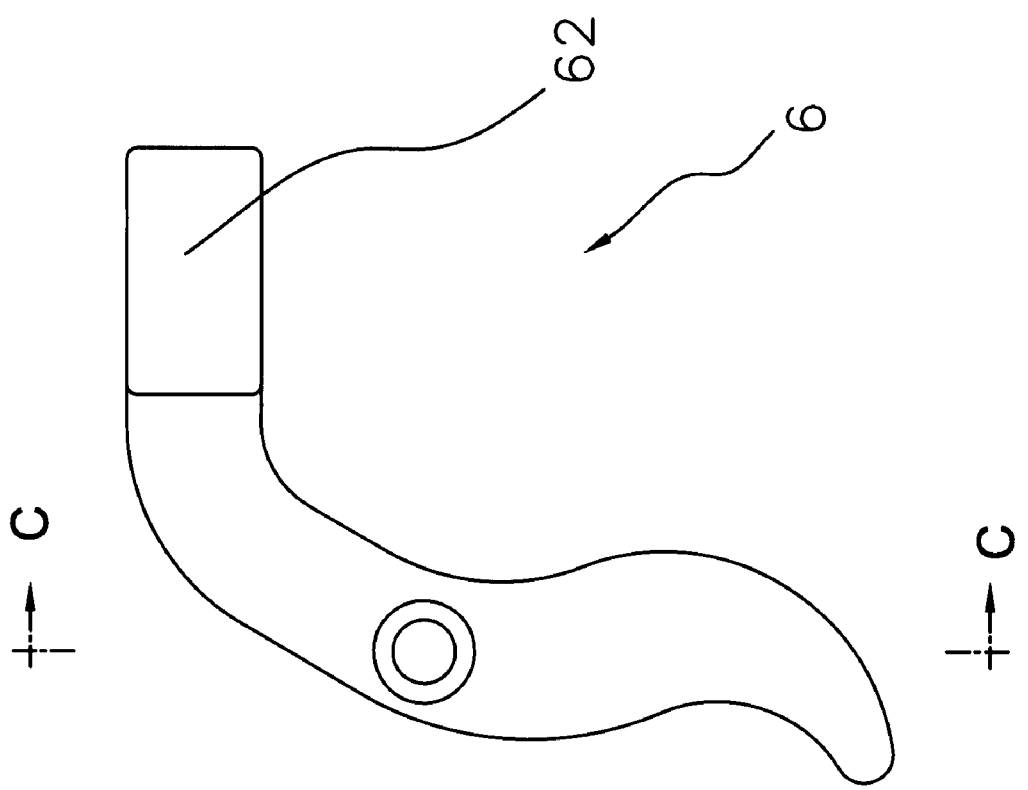
FIG. 9 is a zoomed-in view of the operative block according to the above preferred embodiment of the present invention.

Referring to FIGS. 1, 7 and 8 of the drawings, the automatic container coupling tool further comprises a rotating pin 5 pivotally engaged with the coupling body 1 and disposed at a position above the coupling platform 11, and an operative block rotatably engaged with the rotating pin 5. According to the preferred embodiment, the operative block 6 is divided by the rotating pin 5 into a lever portion and blocker portion, wherein the blocker is heavy in weight compared with the lever portion. As shown in FIGS. 8 and 9, there is a pin hole 61 formed on the operative block 6 to accommodate to the rotating pin 5, and a protruding portion 62 protruded from the blocker portion for further locating the coupling tool within the corner fitting housing. Since is the weight lever portion is lighter than that of the blocking portion, the blocker portion would be automatically fall down into the corner fitting housing in the engaging position.

Figure 11:
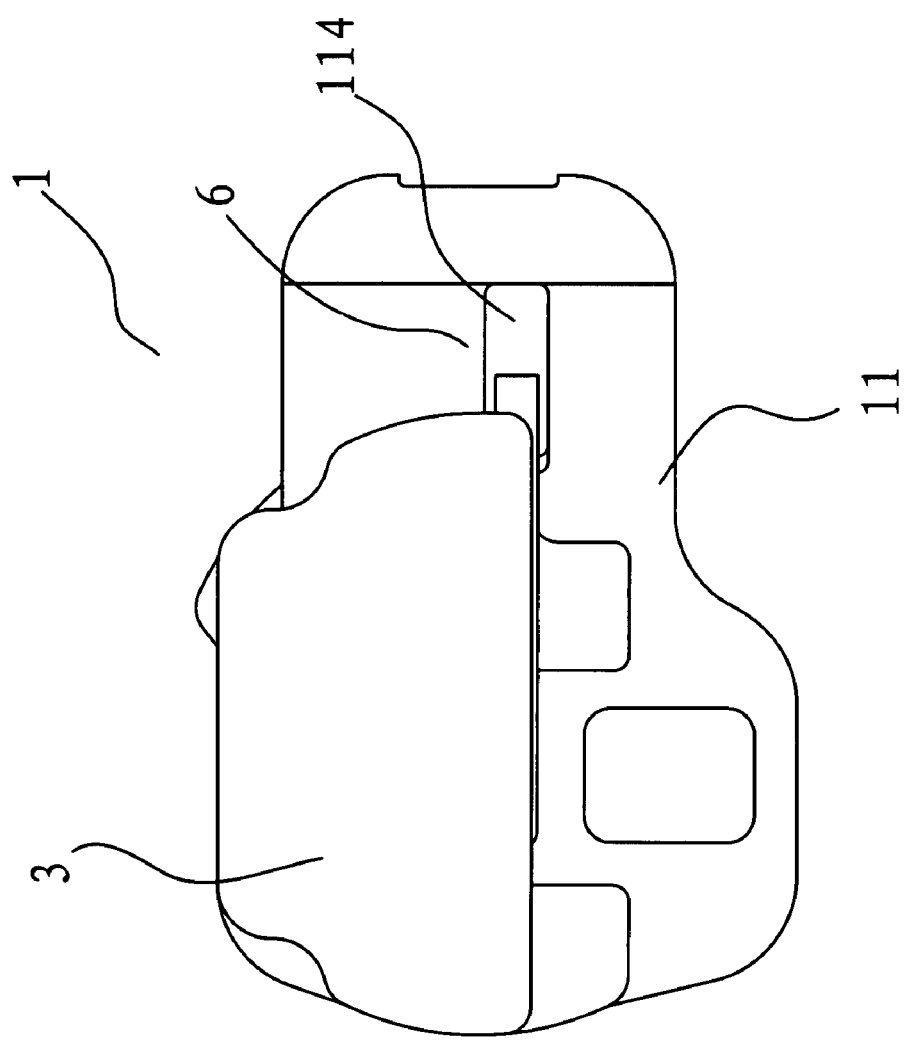
FIG. 11 is a top view of the automatic container coupling tool according to the above preferred embodiment of the present invention.

As shown in FIGS. 1 and 11, there is a through hole 114 defined on the coupling platform 11 for allowing the operative block fall into the top corner fitting housing of the lower container.

Figure 6:
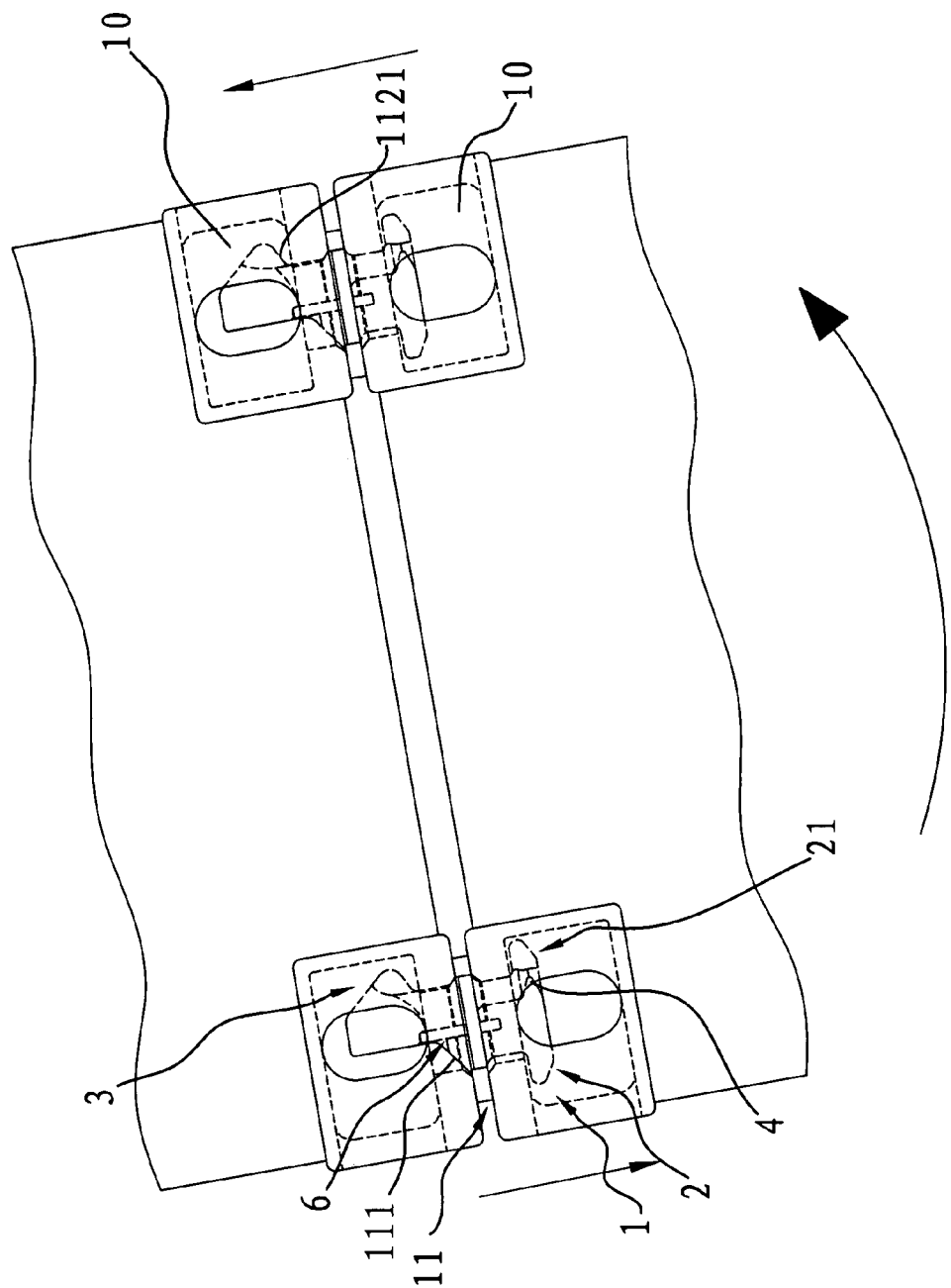
FIG. 6 illustrates the automatic container applied to couple with containers according to the above preferred embodiment of the present invention.

As shown in FIG. 6, the container coupling tool tightly coupled with two containers stacked one on the other via the top guiding protrusion and the bottom engager tightly biased against.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope

What is claimed is:

1. An automatic container coupling tool adapted for disposing between a pair of container including a lower container and an upper container, stacked one another for preventing a displacement thereof, comprising:
 a coupling tool body having a coupling platform;
 a bottom engager downwardly extended from said platform and adapted to be inserted into a top corner fitting housing of said lower container, wherein said bottom engager comprises an engager neck and a pair of opposed projecting lugs sidewardly provided at a lower edge of said engager neck to define an elongated engager plate and define a pair of holding cavities between each said projecting lug and said coupling platform, wherein said elongated plate is correspondingly shaped to match an opening of said corner fitting housing so as to enable said bottom engager to be inserted into said top corner fitting housing and shifted between an engaging position and a disengaging position;
 wherein at said disengaging position, said elongated plate is capable of being freely extracted from said corner fitting housing, at said engaging position, said bottom engager is rotated forcing a ceiling wall of said top corner fitting housing received within said holding cavities to interlock said bottom engager with said lower container; and
 a top guiding protrusion upwardly extended from said platform and adapted to be inserted into a bottom corner fitting housing of said upper container, wherein said top guiding protrusion comprises a lower guiding slope defined at a front side of said top guiding protrusion and an upper retaining shoulder provided at a rear side of said top guiding protrusion, such that after said bottom engager is interlocked within said lower container in said engaging position, said upper container is capable of being lowered for aligning said bottom corner fitting housing with said coupler tool body wherein an opening edge of said bottom corner fitting housing is slides against said guiding slope so as to rearwardly shift said top guiding protrusion with respect to said bottom corner fitting housing thus pushing said upper retaining shoulder in a shoved manner into said bottom corner fitting housing to retain said upper container in position above said coupling tool.

2. The automatic container coupling tool, as recited in claim 1, wherein said upper retaining shoulder further comprises a bottom inclined slope, such that in said disengaging position, after said upper container is lifted by a foreign force, said upwardly moved bottom corner fitting housing will immediately press said bottom inclined slope of said retaining shoulder, thus shoving said top guiding protrusion for shifting frontward to release said bottom corner fitting housing from said coupling tool.

3. The automatic container coupling tool, as recited in claim 1, wherein the engager neck is a parallelogram shaped barrel downwardly extended from said coupling platform, wherein said two projecting lugs are oppositely projected from a pair of parallel sides of said engager neck at a lower position to be functional as a pair of diagonal struts at a bottom end of said engager neck.

4. The automatic container coupling tool, as recited in claim 2, wherein the engager neck is a parallelogram shaped barrel downwardly extended from said coupling platform, wherein said two projecting lugs are oppositely projected from a pair of parallel sides of said engager neck at a lower position to be functional as a pair of diagonal struts at a bottom end of said engager neck.

5. The automatic container coupling tool, as recited in claim 1, wherein said bottom engager further comprises a rotating blocker laterally protruding from a corner of said elongated plate for facilitating said bottom engager to be shifted between said disengaging position and said engaging position with a corrected orientation.

6. The automatic container coupling tool, as recited in claim 3, wherein said bottom engager further comprises a rotating blocker laterally protruding from a corner of said elongated plate for facilitating said bottom engager to be shifted between said disengaging position and said engaging position with a corrected orientation.

7. The automatic container coupling tool, as recited in claim 4, wherein said bottom engager further comprises a rotating blocker laterally protruding from a corner of said elongated plate for facilitating said bottom engager to be shifted between said disengaging position and said engaging position with a corrected orientation.

8. The automatic container coupling tool, as recited in claim 1, wherein said bottom engager, said top guiding protrusion and said coupling platform are integrally formed.

9. The automatic container coupling tool, as recited in claim 4, wherein said bottom engager, said top guiding protrusion and said coupling platform are integrally formed.

10. The automatic container coupling tool, as recited in claim 7, wherein said bottom engager, said top guiding protrusion and said coupling platform are integrally formed.

11. The automatic container coupling tool, as recited in claim 1, further comprising a rotating pin pivotally engaged with said coupling tool body and disposed at a position above said coupling platform, and an operative block rotatably engaged with said rotating pin for strengthening said engaging position.

12. The automatic container coupling tool, as recited in claim 2, further comprising a rotating pin pivotally engaged with said coupling tool body and disposed at a position above said coupling platform, and an operative block rotatably engaged with said rotating pin for strengthening said engaging position.

13. The automatic container coupling tool, as recited in claim 4, further comprising a rotating pin pivotally engaged with said coupling tool body and disposed at a position above said coupling platform, and an operative block rotatably engaged with said rotating pin for strengthening said engaging position.

14. The automatic container coupling tool, as recited in claim 7, further comprising a rotating pin pivotally engaged with said coupling tool body and disposed at a position above said coupling platform, and an operative block rotatably engaged with said rotating pin for strengthening said engaging position.

15. The automatic container coupling tool, as recited in claim 9, further comprising a rotating pin pivotally engaged with said coupling tool body and disposed at a position above said coupling platform, and an operative block rotatably engaged with said rotating pin for strengthening said engaging position.

16. The automatic container coupling tool, as recited in claim 1, including an operative block comprising a lever portion and blocker portion, wherein the blocker portion is heavy in weight compared with said lever portion, wherein said coupling platform further has a through slot for enabling said blocker portion to fall down into said corner fitting housing of said lower container in said engaging position.

17. The automatic container coupling tool, as recited in claim 4, including an operative block comprising a lever portion and blocker portion, wherein the blocker portion is heavy in weight compared with said lever portion, wherein said coupling platform further has a through slot for enabling said blocker portion to fall down into said corner fitting housing of said lower container in said engaging position.

18. The automatic container coupling tool, as recited in claim 7, including an operative block comprising a lever portion and blocker portion, wherein the blocker portion is heavy in weight compared with said lever portion, wherein said coupling platform further has a through slot for enabling said blocker portion to fall down into said corner fitting housing of said lower container in said engaging position.

19. The automatic container coupling tool, as recited in claim 11, wherein said operative block further comprise a lever portion and blocker portion, wherein the blocker portion is heavy in weight compared with said lever portion, wherein said coupling platform further has a through slot for enabling said blocker portion to fall down into said corner fitting housing of said lower container in said engaging position.

20. The automatic container coupling tool, as recited in claim 15, including an operative block comprising a lever portion and blocker portion, wherein the blocker portion is heavy in weight compared with said lever portion, wherein said coupling platform further has a through slot for enabling said blocker portion to fall down into said corner fitting housing of said lower container in said engaging position.

* * * * *